(12) United States Patent
De Schipper (10) Patent No.: US 6,867,821 B2
(45) Date of Patent: Mar. 15, 2005

(54) IMAGE-SENSING DISPLAY DEVICE WITH PARTICULAR LENS AND SENSOR ARRANGEMENT

(75) Inventor: Marien De Schipper, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 76 days.

(21) Appl. No.: 09/915,681

(22) Filed: Jul. 26, 2001

(65) Prior Publication Data

US 2002/0030775 A1 Mar. 14, 2002

(30) Foreign Application Priority Data

Jul. 31, 2000 (EP) ............................................. 00202729

(51) Int. Cl.[7] .............................................. G02F 1/135
(52) U.S. Cl. ...................................................... 349/28
(58) Field of Search ................................... 349/113, 28

(56) References Cited

U.S. PATENT DOCUMENTS

| 5,340,978 A | | 8/1994 | Rostoker et al. ......... 250/208.1 |
| 5,585,817 A | * | 12/1996 | Itoh et al. ................... 345/104 |
| 5,619,351 A | | 4/1997 | Funamoto et al. ............ 349/61 |
| 5,812,109 A | * | 9/1998 | Kaifu et al. ................. 345/104 |
| 5,816,677 A | | 10/1998 | Kurematsu et al. ........... 362/31 |
| 5,977,535 A | * | 11/1999 | Rostoker .................. 250/208.1 |
| 6,137,535 A | * | 10/2000 | Meyers ........................ 348/340 |
| 6,196,692 B1 | * | 3/2001 | Umemoto et al. ............. 362/31 |
| 6,628,263 B1 | * | 9/2003 | Konuma et al. ............. 345/104 |

FOREIGN PATENT DOCUMENTS

| EP | 0385128 A2 | 5/1990 | ............. H04N/7/14 |
| EP | 0881426 A1 | 12/1998 | ............. F21V/8/00 |
| WO | WO9819435 | 7/1998 | ............. H04M/1/02 |

OTHER PUBLICATIONS

"Novel Polarized Liquid Crystal Color Projection and new TN–LCD Operating Modes" by Martin Schadt and Jurg Funischilling, to be presented at SID 90, Las Vegas.

* cited by examiner

Primary Examiner—Frank G. Font
Assistant Examiner—Timothy L. Rude (57) ABSTRACT

An image-sensing display panel comprises an image display, including a display panel (30) and lighting means, and an image sensor (40). By using a reflective LCD display panel (30) and arranging the light guide (50) of the lighting means in front of the image sensor (40), the device has a high light efficiency, and lens means (110, 120, 130) can be integrated in components (40, 50, 100) of the device, which results in a compact construction of the device.

1 Claim, 7 Drawing Sheets

IMAGE-SENSING DISPLAY DEVICE WITH PARTICULAR LENS AND SENSOR ARRANGEMENT

The invention relates to an image-sensing display device comprising:

an image display part including a display panel and lighting means for illuminating the panel, and an image-sensing part arranged on top of the display panel and including a two-dimensional array of photosensitive elements.

The invention also relates to a video communication apparatus in general and to a videophone apparatus, for example a mobile phone apparatus, in particular.

A videophone apparatus is a telecommunication apparatus that allows users at different sites to talk to each other, but also to view each other's faces. Such apparatus should comprise a loudspeaker, a display, a microphone and a camera. In older embodiments of a cord videophone apparatus, the display is a cathode ray tube (CRT) display and the camera is mounted at a central position above the CRT. The size of such an embodiment is mainly determined by the size of the CRT. In modern embodiments of the videophone apparatus, the display is constituted by a flat display panel, for example an LCD panel. The picture displayed by this panel can be projected on the rear side of a projection screen, the front side of which is observed by the user. The camera is arranged behind the projection screen, and this screen can be switched between a fully transparent state, wherein the camera takes a picture, and a diffuse state, wherein the picture from the display panel is displayed to the user. This apparatus provides a relatively large image which can be viewed from a larger distance.

Modern cordless and cellular, or mobile, phone apparatuses comprise a small and direct-view LCD (liquid crystal display) panel for displaying phone numbers, time and other data. Liquid crystals are materials which are well suited for use as tiny optical switches to turn picture elements (pixels) on and off. Applying a voltage across this material changes the alignment and light-polarizing properties of its elongated molecules, so that they can be used in conjunction with polarization filters to implement an electronic shutter. An image can be displayed with a two-dimensional array of such pixels.

Such an apparatus can be constructed as a videophone apparatus, provided that the camera functions of forming an image of the object and converting this image into an electrical signal can be combined with, or built in the apparatus.

U.S. Pat. No. 5,340,978 relates to a camera including a solid-state sensor and describes various arrangements for employing optical elements in association with the photosensitive elements of the image sensor. Also described is an image-sensing display panel comprising an LCD panel, a substrate having an array of photosensitive elements disposed on its surface and an optically transparent layer arranged above the array and capable of focussing light onto said array. Various embodiments of this image-sensing display panel are shown, which embodiments differ from each other by the mutual arrangement of the LCD panel, the array of photosensitive elements and the transparent layer. In each of these embodiments, the LCD panel is a transmission panel and the lighting means are back-lighting means.

It is an object of the present invention to provide an improved image-sensing display device of the kind defined in the preamble for use in a mobile videophone apparatus and for other applications. This device is characterized in that the display panel is a reflective panel and in that the lighting means are front-lighting means and arranged in front of the array of photosensitive elements.

A mobile or cordless videophone system is to be used in daylight circumstances and should display a bright image. By using a reflective display panel, a bright image can be obtained with a relatively low lighting intensity and a corresponding relatively low electric power consumption, which is also of great importance for a mobile or cordless videophone. Moreover, as the front-lighting means are arranged in front of the array of the photosensitive elements, imaging elements of the camera can be accommodated in these lighting means.

In the present specification, a cordless videophone apparatus is understood to be a videophone apparatus which receives and transmits sound and vision signals via a receiver and transmitter device in the neighborhood and connected to a cable network. A mobile videophone apparatus is a videophone apparatus which travels with the user and receives and transmits sound and vision signals through the air from a local transmitter, which may be situated at a larger distance.

Integration of the camera function and the display function in one module provides the advantage that signal processing, like first processing and interpretation, video processing and -correction and coding, van be carried out by an on-board processor of the module. Thereby a huge amount of data transmission to and from the board processor can be avoided which saves power consumption and increases data rate. An additional advantage of integration is that freedom of design is enhanced.

A first embodiment of the image-sensing display device, wherein the display panel comprises a transparent front plate, is characterized in that the array of photosensitive elements is arranged under the front plate.

A second embodiment of the image-sensing display device, wherein the display panel comprises a transparent front plate, is characterized in that the array of photosensitive elements is arranged on the front plate The camera lens means for imaging an object or scene on the array of photosensitive elements may be a single lens element arranged in front of the image-sensing display device. A preferred embodiment of the image-sensing display device, wherein the lighting means comprises a front light guide, is, however, characterized in that lens means are integrated in the light guide.

By using the front light guide as a carrier for lens means, a high degree of integration becomes possible and a compact construction is obtained.

A front light guide is understood to be a flat plate of transparent material arranged at the front side of the image-sensing display device and wherein light from a source, for example one or more LEDs, is coupled in via one or more side faces and, after one or more reflections at the flat main faces, is sent to the LCD panel.

A further preferred embodiment of the image-sensing display device is characterized in that lens means are arranged on the front plate of the LCD panel.

The latter lens means may replace the lens means integrated in the light guide or may be combined with them. In the latter case, an improved image may be formed on the array of photosensitive elements.

The image-sensing display device may be further characterized in that the array of photosensitive elements is constituted by a CCD sensor.

CCD (charge-coupled device) sensors have matured in reliable and high resolution sensors which are very suitable for the device of the present invention.

Alternatively, the image-sensing display device may be characterized in that the array of photosensitive elements is constituted by a C-MOS image sensor.

A C-MOS image sensor, which shows the advantages that it can be integrated with other circuitry on a single chip and has reduced packaging costs, is an attractive image sensor for the device of the present invention.

The image-sensing display device may be further characterized in that the display panel is an LCD panel.

LCD panels, which are widely used as high-resolution, full-color displays, are very suitable as display panels in the devices of the present invention.

The material of the LCD panel may be a cholesteric liquid crystal. Such a crystal has a periodic structure with a periodicity that matches a given, visible, wavelength. It can be switched between a first state, wherein light of said given wavelength is reflected, and a second, transparent, state. A cholesteric liquid crystal display consumes power only when its information content is changed and allows lower power consumption of an LCD that displays relatively stable information. Such a display is therefore very well suitable for a mobile apparatus.

For real video (moving images) applications the image-sensing display device is preferably further characterized in that the material of the LCD panel is a twisted nematic crystal.

Such a liquid crystal allows higher switching rates so that a display panel provided with such a liquid crystal is very suitable to display moving images. The liquid crystal may be a super twisted nematic crystal, which allows rotating of the polarization direction over 180° to 360°, in either a grey tone or a colour version.

The invention also relates to an image communication apparatus comprising image display means, including an image display panel, and camera means, including an image sensor. This apparatus is characterized in that the image display panel and the image sensor are constituted by the image-sensing display device as described above.

Examples of such an image communication apparatus are an adapted flat monitor of a desktop computer or of a notebook computer.

The invention further relates to a videophone apparatus comprising a voice communication part and an image communication part, wherein the image communication part comprises image display means, including an image display panel, and camera means, including an image sensor. This apparatus is characterized in that the image display panel and the image sensor are constituted by the image-sensing display device as described above.

The advantages of the invention are prominent for a videophone apparatus which is constructed as a mobile apparatus.

These and other aspects of the invention are apparent from and will be elucidated with reference to the embodiments described hereinafter. In the drawings.

Figure 1:
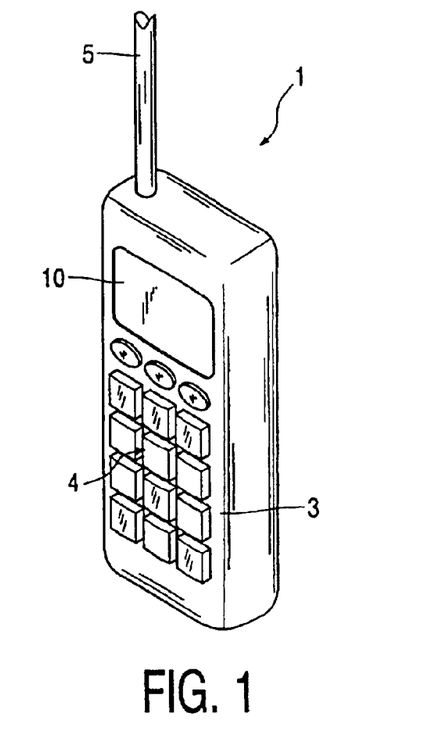
FIG. 1 shows a mobile videophone apparatus wherein the image-sensing displace device of the present invention can be implemented.
Figure 2:
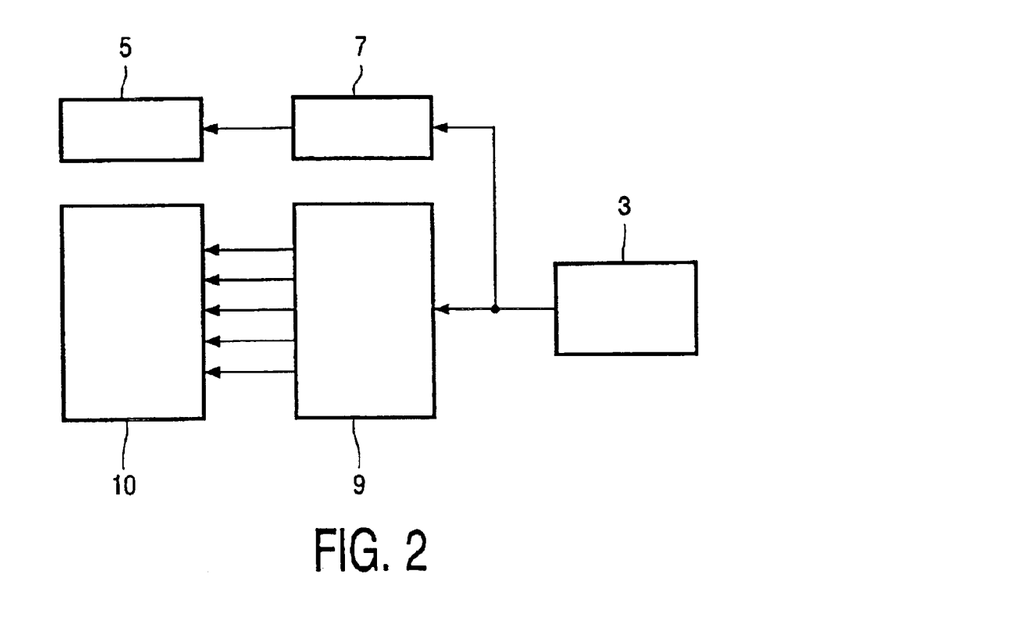
FIG. 2 is a block diagram of the functions of this apparatus.

FIG. 1 is a perspective view of a mobile, or cellular, telephone apparatus 1, the front surface of which is provided with a key entry section 3. This section comprises a number of button switches 4, for dial entry and other functions. A display device 10 is disposed above the section 3 and an antenna 5 is provided on the upper surface of the phone 1. When a dial, such as a ten-key dial, is entered from the button switches 4, information relating to the entered dial is transmitted to a base station of a telephone company from the antenna 5 via a transmitting circuit 7 in the phone 1, as illustrated in FIG. 2.

This Figure is a block diagram of the functions of the telephone. The information relating to the entered dial is sent to a display driving circuit 9 which drives the display device 10 such that this device displays the dial information.

If a conventional mobile telephone apparatus is provided with camera means and its circuitry is adapted, its capabilities are considerably increased. The mobile apparatus can then be used as a videophone apparatus. The original videophone apparatus, which is a cord apparatus, is intended as an extended telephone apparatus which does not only render the voices of two remote users audible, but also renders the faces of these users visible to each other. This apparatus can also be used to render graphics and other data at the site of one user visible to the other user. It has also already been proposed to use a mobile videophone apparatus for displaying moving, or real video, images and for accessing world-wide electronic information networks, like the Internet. To that end, at least the image sensor of the camera means should be incorporated in the mobile videophone apparatus, which means that the display device 10 should be an image-sensing display device instead of a display device only, like an LCD panel.

Integration of the camera function and the display function in one module provides the advantage that signal processing, like first processing and interpretation, video processing and -correction and coding, van be carried out by an on-board processor of the module. Thereby a huge amount of data transmission to and from the board processor can be avoided which saves power consumption and increases data rate. An additional advantage of integration is that freedom of design is enhanced.

Figure 3:
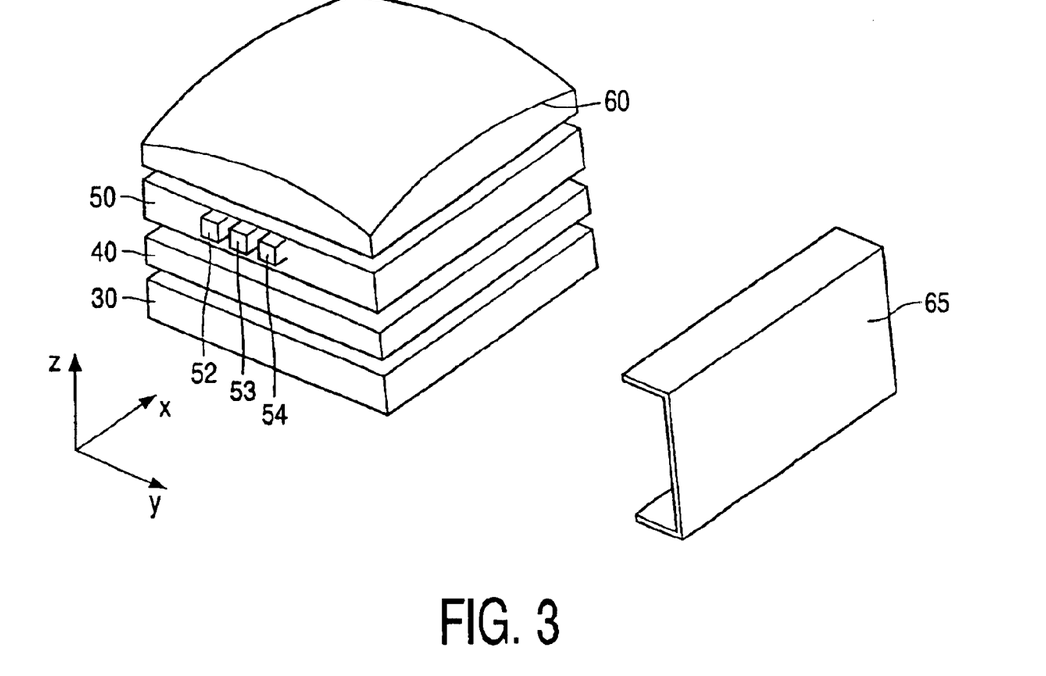
FIG. 3 shows an embodiment of the image-sensing display device of the present invention.

FIG. 3 is an exploded perspective view and shows the components of an image-sensing display device 20 according to the present invention. This device successively comprises, from the base, a display panel 30, an image sensor 40, for example a CCD sensor, a surface lighting means 50 and lens means 60, schematically represented as a curved lens element. The components are juxtaposed in the Z direction, i.e. the viewing direction of a user, and the components 30, 40 and 50 may be integrated in a case 65. The Z-dimensions of the components, relative to their X and Y-dimensions are much smaller than indicated in FIG. 3.

Figure 4:
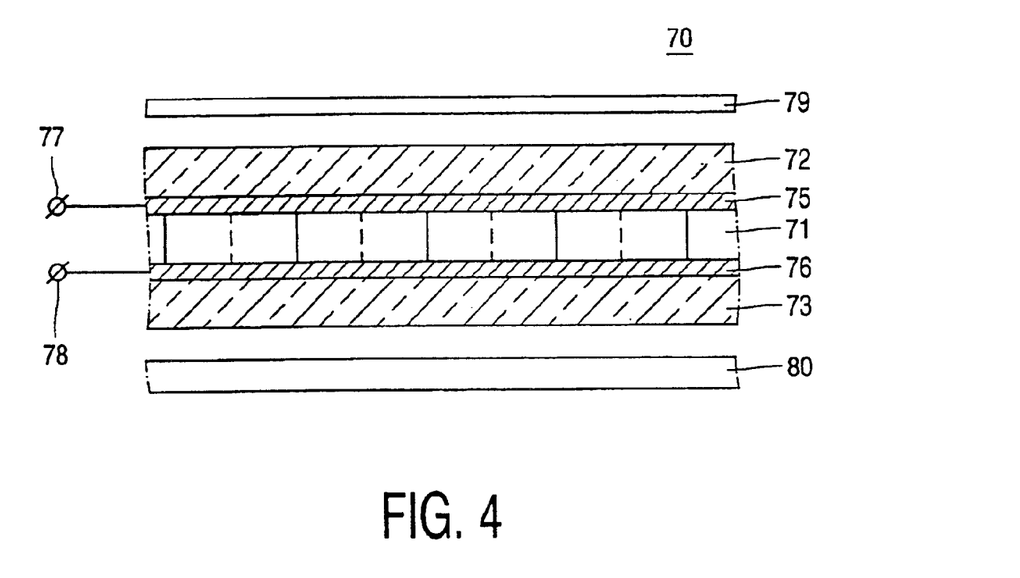
FIG. 4 is a principle circuit diagram of a transmission LCD panel.

FIG. 4 is a diagram of a conventional transmission liquid crystal display panel 70. This panel comprises a layer of liquid crystalline material 71, for example, of the nematic type which is enclosed between two transparent plates 72 and 73, for example, of glass. Drive electrodes 75 and 76 are arranged on each plate. At least the electrode 76 is divided into a large number of rows and columns so that a large number of picture elements, or pixels, in the display panel is defined. The different pixels are driven by driving the matrix electrodes, as is shown schematically by means of the drive terminals 77 and 78. Thus, an electric field can be applied across the liquid crystalline material 71 at the required positions, i.e. the pixel positions. Such an electric field causes a change of the effective refractive index of the material 71, i.e. a change in the alignment and light polarizing properties of its elongated molecules so that the light passing through a given pixel undergoes, or does not undergo, a rotation of the direction of polarization depending on the absence, or presence, of a local electric field at the location of the relevant pixel. By means of a polarizing filter 79 arranged between the electrode 75 and the viewer's eyes, the polarization change is converted into an intensity change so that the pixel becomes visible or non-visible to the viewer. The combination of visible and non-visible pixels forms an image which can be changed rapidly, for example, 25 or 50 times per second. A display panel wherein the pixels are formed by the intersection of, and are directly driven by the voltage between the row and column electrodes is termed a passive-matrix display.

Instead of a passive-matrix display panel, an active-matrix LCD (AMLCD) panel may be used. In this display panel, the drive electronics is constituted by an array of silicon transistors, which are arranged on the plate 73. Each pixel is now driven by its own transistor, preferably a thin-film transistor (TFT). Both types of display panels are described in, for example, EP-A 0,266,184. Active-matrix displays are able to show color images of superb quality and high resolution and are developing to devices which can show more and more complex information. Passive-matrix displays are easier to manufacture and consume relatively low power. These displays are suitable for applications where the demands with respect to brightness, number of pixels and response time are moderate.

LCD panels are not emissive: they do not generate light themselves. Instead, direct-view transmission LCD panels are provided with back-lighting means, comprising a light source and a planar light guide 80 shown in FIG. 4.

In the image-sensing display device of the present invention, a reflective display panel is used instead of a transmission panel. The combination of a reflective display panel and an image sensor is not only new, but provides important advantages especially, but not only, for cordless apparatus. These advantages relate to an efficient use of light, and thus of power of the battery which supplies electric power to the lighting means, and also to constructional aspects of the apparatus.

A reflective LCD panel may use ambient light, so that no additional lighting of the panel is needed when it is used in a bright or daylight environment. The contrast in the displayed image increases with an increasing intensity of the ambient light, because the intensity of the image forming reflected light then also increases, while the degree of blackness of the black pixels does not change. When a transmission LCD panel is used in an environment with increasing ambient light, the contrast of the displayed image will decrease. Then the intensity of the back-lighting should be increased to obtain an image with sufficient contrast. This means that the back-lighting means would consume more electric power, which is disadvantageous, especially for a cordless apparatus which is powered by a battery.

Figure 5:
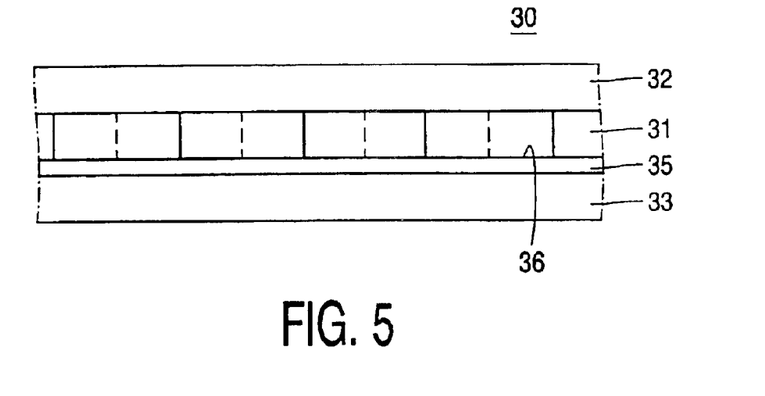
FIG. 5 is a principle circuit diagram of a reflective LCD panel.

FIG. 5 is a diagram of an embodiment of a reflective LCD panel 30 that may be used in the image-sensing display device of FIG. 3. This panel comprises a liquid crystalline layer 31, similar to the layer 71 in FIG. 4. The layer 31 is sandwiched between a transparent plate 32 similar to plate 72 in FIG. 4 and a second plate 33. The plate 32 is provided with one counter electrode and the plate 33 carries an array of driving transistors, one for each pixel, which driving array is schematically indicated by the layer 35. The front side 36 of the plate 33 is reflective. The reflective panel functions in the same way as the transmission panel of FIG. 4, with the exception that the image forming light is reflected and not transmitted.

In the transmission LCD panel, shown in FIG. 4, the effective area of the pixels that is available for polarization modulation of the light is limited by the areas occupied by the drive means for the pixels, i.e. the row and column electrodes for a passive-matrix display or the driving transistors in an active-matrix display. The presence of these portions puts a limit to the resolution of the display panel, i.e. the number of pixels per surface unit area. Since light incident on such area portions, thus outside the effective areas of the pixels, is absorbed and not used for image formation, said portions also put a limit to the light efficiency of the display, i.e. the ratio of the amount of light used for image formation and the amount of light incident on the display panel, and thus to the brightness of the displayed image. The brightness could be improved by increasing the intensity of the light incident on the panel, which implies more battery power consumption, or by adding lens means to the panel, such as a microlens array to concentrate the available light on the effective areas of the pixels, which complicates the structure of the device.

However, the above limits do not occur in a reflective active-matrix panel of FIG. 5, wherein the driving transistors are arranged under the liquid crystalline layer 31 and do not cover portions of this layer. Now, substantially the whole surface area of the liquid crystalline layer can be occupied by effective areas of the pixels and the panel has a larger resolution than a transmission panel and a reflective passive-matrix panel. Moreover, substantially all of the light incident on the panel is reflected and modulated and used for display of the image. Whereas, in general, a reflective LCD panel has a higher light efficiency than a transmission panel, an active-matrix display reflective panel shows the further advantages of higher resolution and excellent image quality. Incorporating an image-sensing display device with such a panel in a mobile or cordless telephone apparatus will render this apparatus suitable as a videophone apparatus for displaying high-quality data, graphics and video images and for accessing, for example, the world-wide Internet or other communication networks.

In practice, a reflective LCD panel for the envisaged applications will be provided with lighting means. However, these means may be switched on only when needed, i.e. when the ambient light is too weak. For a transmission LCD panel, the back-lighting means should be switched on under all circumstances of use, so that a reflective panel is more efficient with respect to electric power consumption than a transmission panel.

The lighting means for the reflective panel used in the image-sensing display device is a front-lighting means, which comprises a flat light guide arranged in front of the image sensor. This construction provides the possibility to integrate camera lens elements in the front light guide or in the image-sensing display device. It will be clear that the light source of the lighting means is switched on only in the display mode of the device and is not switched on in the camera mode.

The front-lighting means has two main flat surfaces behind each other in the viewing direction, i.e. the Z-direction of FIG. 2, so that one of these, or both, surfaces can be provided with a lens structure.

Figure 6:
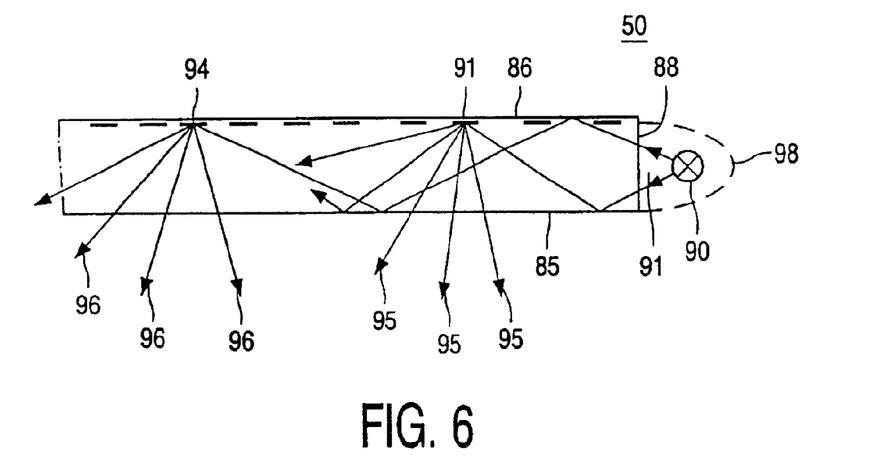
FIG. 6 shows an embodiment of the lighting means to be used with a reflective LCD panel.

FIG. 6, which is a cross-section of an embodiment of the front-lighting means 50, illustrates the principle of this means. The front-lighting means comprises a transparent light guiding plate 81, for example, of glass or transparent plastics. FIG. 6 shows only a portion of this plate. The plate 81 has a lower main flat surface 85, facing the image sensor (not shown in FIG. 6), an upper main flat surface 86 and four side surfaces, only one of which, 88, is shown in FIG. 6. At least one light source 90 is arranged opposite at least one of the side surfaces. The plate is provided with a number of scattering elements 93. Light rays 91 from the source 90 enter the plate 81 via the side surface 88 and are total internally reflected one, two or more times, dependent on the direction of a ray, before they reach a scattering element 93. Such an element reflects light incident thereon in different directions. A portion of the reflected light, indicated by the rays 95, has such a direction that it passes through the lower main surface 85 of the plate and propagates to the LCD panel 30. The rest of the reflected light further propagates in the plate 81 until it reaches a further scattering element 94. A portion of the light reflected by this element passes through the lower surface 85 of the plate 81 and the rest further propagates through the plate. This goes on until substantially all the light that entered the plate via the side surface 88 is coupled out of the plate and is directed towards the LCD panel 30. This process will be enhanced if the side face of the plate opposite the entrance face is made reflective. A reflector, indicated by the broken line 98, may be arranged around the light source 90 to increase the amount of source light that enters the plate. For example, the light source may be arranged in a parabolic reflector, which is placed against the entrance side face of the plate.

For back-lighting means, i.e. means for illuminating the rear side of a transmission panel, various embodiments are known, for example from U.S. Pat. No. 5,816,677 and EP-A 0,881,426. Features known for back-lighting means can also be used in front-lighting means. For example, the light source may be a light tube arranged at one side face of the light guide plate, or two or more of such tubes may be arranged at different side faces of the plate. It is also possible to use a bent tube that surrounds the plate. Such tubes for a back light are described in U.S. Pat. No. 5,619,351. For a small image-sensing display device, the light source is preferably a light-emitting diode, or LED. Bright and small-sized LEDs with a low power consumption and a long life time are now available in different colors. For a color image-sensing display device, one or more sets of three LEDs emitting the primary colors red, green and blue may be used. FIG. 3 shows one such set of three LEDs 52, 53 and 54. For front lighting conventional LED's can be used. Another option is to use currently developed LED's comprising polymer material or LED's comprising organic material 8 July 2001l, in view of their capability to display video images.

The scattering elements 91, 94 etc. may be constituted by portions of spheres, blocks or flat elements. If light sources are arranged at opposite side surfaces of the light guide plate 50, these scattering elements may be distributed uniformly on the flat upper surface 80 of this plate, so that the light leaving the plate via the surface 85 shows the required uniform intensity. If one or more light sources are arranged at only one side face of the plate 50, the uniform intensity can be obtained by increasing the density of the scattering elements, i.e. the number of such elements per flat surface area unit, from the light incidence face to the opposite face. If the light enters the plate 50 via both a YZ face and an XZ face, it can be arranged that both in the X-direction and in the Y-direction the density of the scattering elements increases from these faces to the opposite faces. A uniform intensity of the light leaving the plate 50 can also be obtained by adapting the properties of the scattering elements, for example, their dimensions or their scattering power, such that less scattering occurs at the position of the light incident face(s) than at the opposite face(s). Under circumstances, it may be preferred that the light illuminating the display panel is not uniformly distributed. Such a required non-uniform illumination can also be obtained by adapting the density of the scattering elements and/or their scattering properties.

The image sensor, 40 in FIG. 3, is a so-called solid-state sensor comprising a two-dimensional array of photosensitive elements on a substrate. The substrate may be a silicon semiconductor substrate. The array of photosensitive elements may be a well-known CCD (charge-coupled device), an array of memory cells which discharge upon incidence of light, a CMOS array or any other suitable device the state of which is changed or which generates a signal or signal difference upon incidence of light. For example, a CMOS image sensor as described in the article: "Design of real-time image enhancement preprocessor for CMOS image sensor" in: IEEE Transactions on Consumer Electronics, Vol. 46, No. 1, February 2000, pages 68–75, may be used. The array of photosensitive elements may comprise hundreds or thousands of rows and columns and may have a square or rectangular shape. The elements may be evenly spaced or the elements of one row, or column, may be offset from the elements of an adjacent row, or column. The image-sensing array has sufficient transmission so that an image displayed on the display panel may be seen through the array.

The image-sensing array 40 may be arranged on the LCD panel, i.e. on the front glass of this panel. It is, however, also possible to arrange the image-sensing array at the underside of the front glass. These embodiments are schematically illustrated in FIGS. 7a and 7b, respectively, wherein the front glass is indicated by the reference numeral 100.

Figure 8:
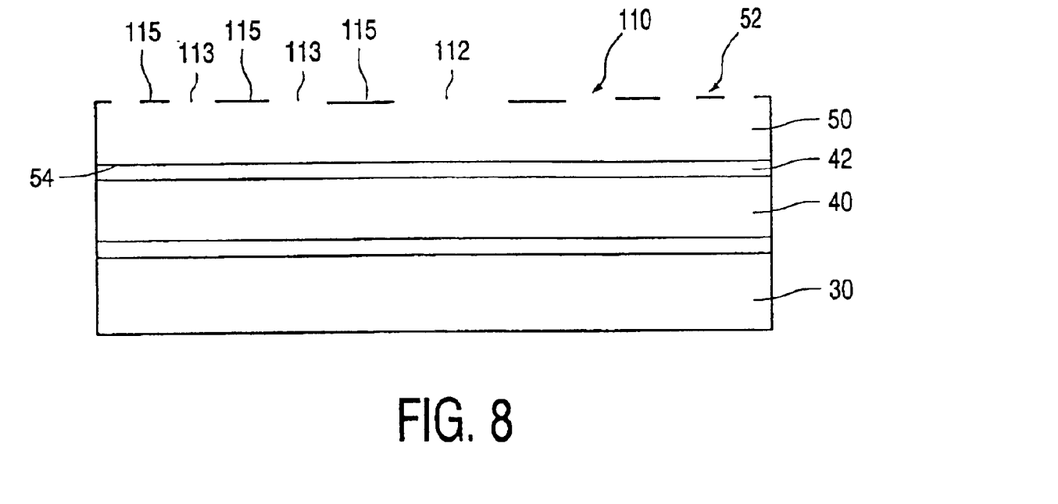
FIG. 8 shows such a device with a planar lens structure at the upper surface of the light guide.
Figure 9:
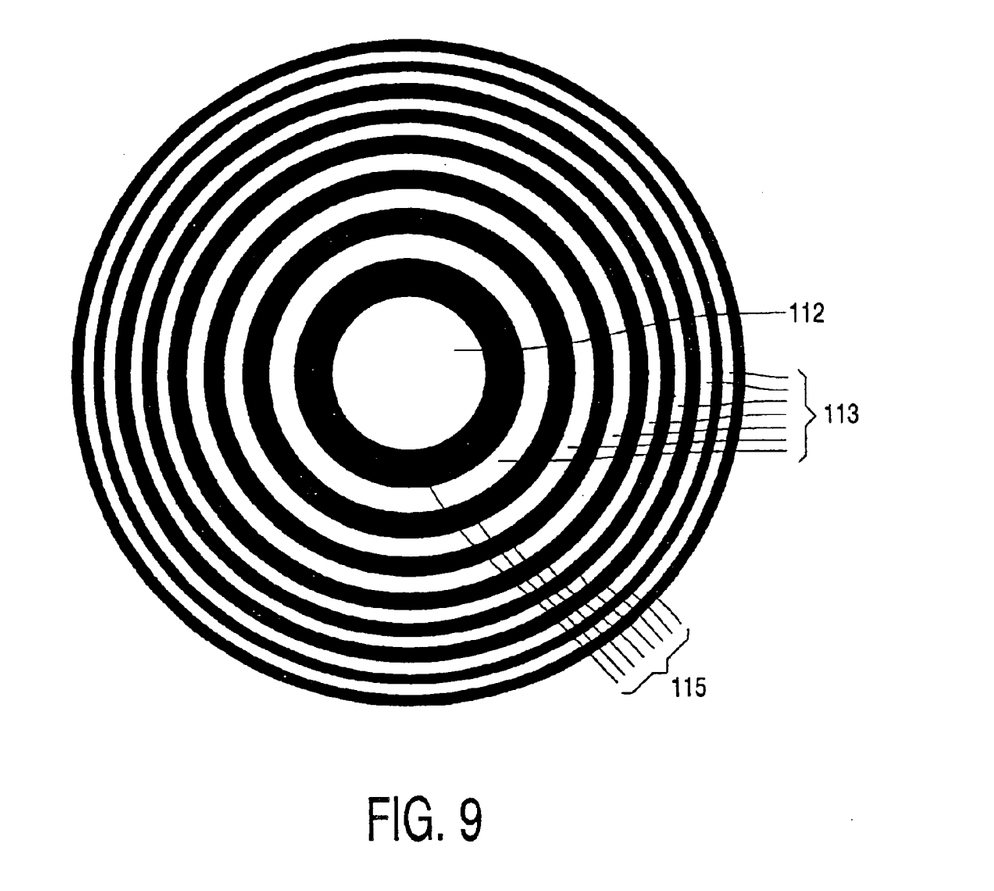
FIG. 9 is a top view of a Fresnel lens.

The image-sensing display device should be provided with lens means to image a subject or scene or computer data (graphics) on the image-sensing array. Such lens means could be a separate lens element 60 mounted in front of the device, as shown in FIG. 4. However, the construction of the device allows integration of the required lens means and addition of further lens means without substantially enlarging or complicating the device. As shown in FIG. 8, a planar objective lens 110 may be provided on the top surface of the light guide 50 in the embodiment of FIG. 7a. Such a lens, the operation of which is based on diffraction instead of on refraction, may be a Fresnel lens. FIG. 9 is a top view of such a Fresnel lens. The lens structure is constituted by a transparent central circular portion 112 and a large number of alternating non-transparent and transparent rings 115 and 113, respectively, the width and mutual spacing of which decreases from the center to the periphery. Instead of this amplitude structure, the Fresnel lens may have a phase structure. The latter structure consists of rings which introduce alternately a first phase shift, for example 0°, and a second phase shift, for example 180°, in the beam portion passing through them. The beam portions from the different rings constructively interfere with each other in the focal plane of the Fresnel lens, so that the total result is comparable with that of a refractive lens. For clearness' sake, in FIGS. 8 and 9 only show a few of the rings; in practice, the number of rings is much larger. The planar lens 110 may also be arranged at the lower surface 54 of the light guide 50 or at the upper surface 42 of the image sensor 40.

Figure 10:
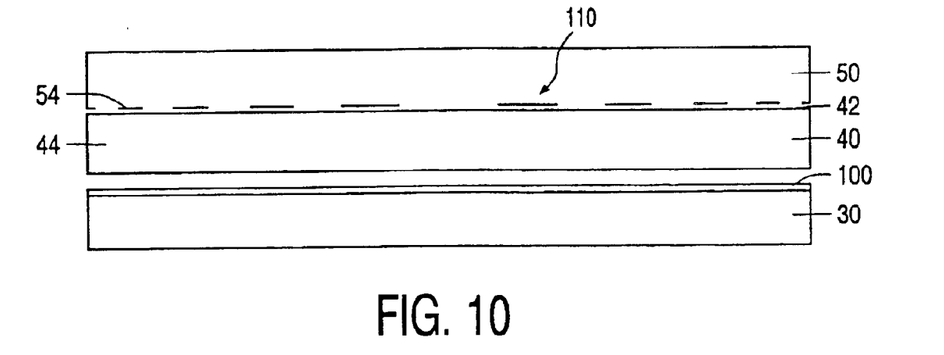
FIG. 10 shows an image-sensing display device with a planar lens structure at the lower surface of the light guide.

As shown in FIG. 10, the planar objective lens 110 may also be arranged at the lower surface 54 of the light guide. It is also possible that the planar lens is arranged at the upper surface 42 of the image sensor 40. Also in the embodiment of FIG. 7b, a planar objective lens can be arranged on either the upper surface or the lower surface of the light guide 50 or in the front glass 100 of the combined display and image-sensing panel.

Figure 7A:
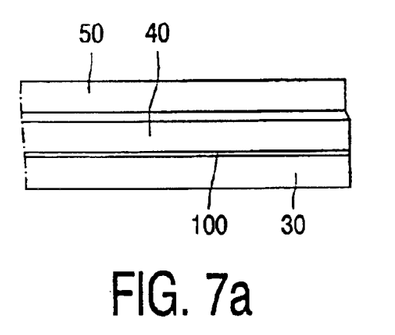
FIGS. 7a and 7b show two embodiments of the image-sensing display device of the present invention.
Figure 7B:
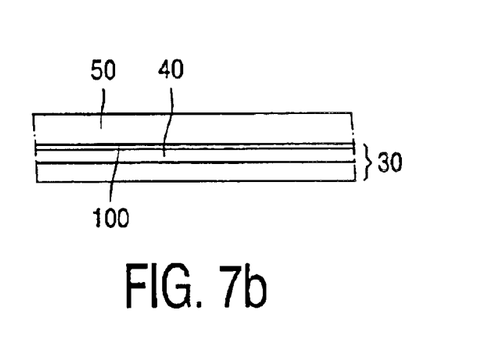

A second planar lens may be arranged in the image-sensing display devices of FIGS. 7a and 7b on a surface other than the surface which carries the first planar lens. Such a second lens can compensate for the lens aberrations of the first lens.

Figure 11:
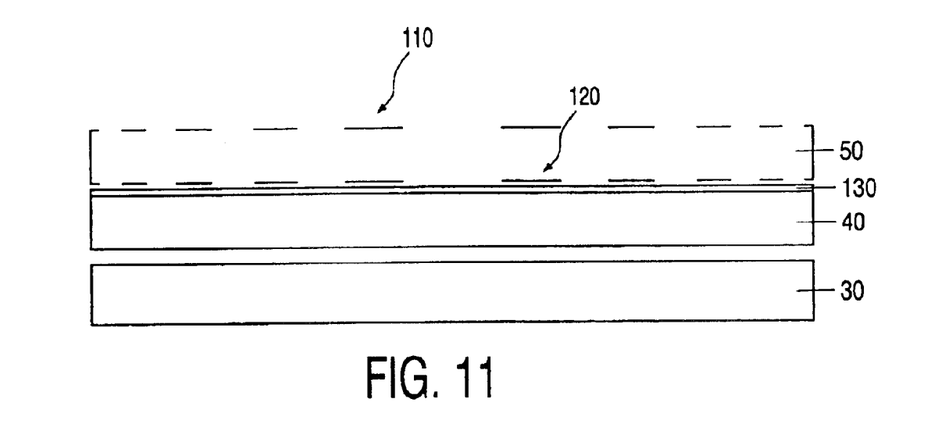
FIG. 11 shows an image-sensing display device with two planar lens structures and a microlens structure.

As the new image-sensing display device comprises three surfaces in front of the image-sensing array, namely the upper (52) and lower (54) surfaces of the light guide (50) and either the upper surface of the image sensor 40 (FIG. 7a) or the front glass 100 (FIG. 7b), in principle, this device can be provided with three lens structures. One or two of these structures may be a microlens structure, which can be used to concentrate the incident light on the photosensitive elements of the image-sensing array. FIG. 11 shows an embodiment of the image-sensing display device which comprises a first planar lens 110 on the upper surface 52 of the light guide 50, a second planar lens 120 on the lower surface 54 of the light guide and a microlens structure 130 on the upper surface of the image sensor 40.

Figure 12:
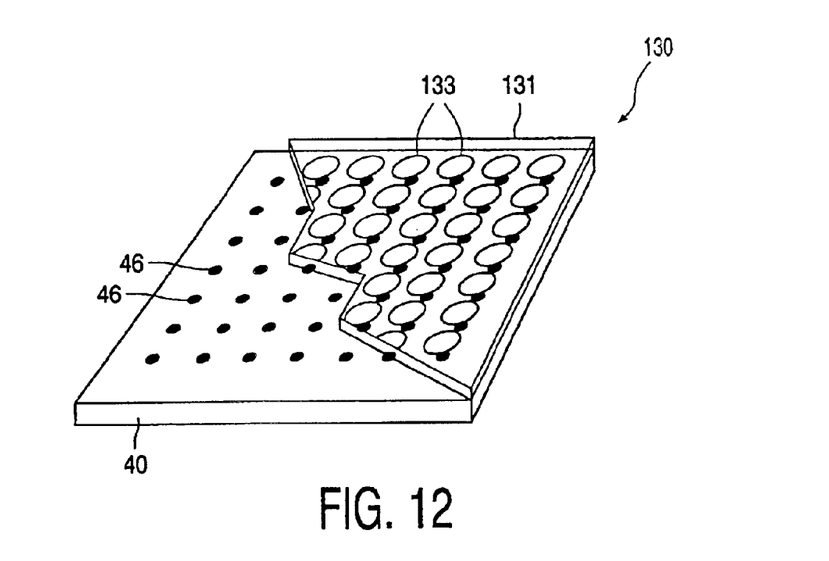
FIG. 12 shows an image sensor with a microlens structure.

FIG. 12 is a perspective view of an embodiment of the microlens structure 130 on top of the image sensor 40. The photosensitive elements of this sensor are indicated by the reference numeral 46. The microlens structure may comprise one lens for each photosensitive element. If the photosensitive elements are arranged in groups of three, which may be the case for a color camera wherein the three elements of each group are destined to receive light of different colors (red, green or blue), one microlens may be provided for each group of three elements. The microlenses 133 may be refractive elements and may be constituted by spherical indentations in, or spherical bumps on, a thin plate 131. Preferably, the microlenses are planar diffraction elements, which are integrated in the front surface of the image sensor.

The number of lens structures and the kind of lens structures, Fresnel lens or microlens, and in which of said three surfaces the lens structures are integrated is determined by the required image quality.

The liquid crystal in the display panel 30 may be a so-called cholesteric liquid crystal. In a transversal cross-section of the cholesteric liquid crystal layer, its molecular structure is a helical structure with a periodicity that matches the wavelength of visible light. The use of such a liquid crystal as a polarization and color filter in an LCD image projector is described in the article: "Novel polarized liquid crystal color projector and new TN-LCD operating modes" presented at the SID conference, 15–17 May, Las Vegas. A cholesteric liquid crystal has the advantage of being stable in two states. In one state, the orientation of the molecules belonging to given layer surface domains (pixels) is such that light with a matched wavelength is reflected by these domains. In this state, the domains form microscopic interference filters. In the second state, the liquid crystal has domains that are too small to generate significant interference, resulting in the layer being transparent. With an appropriate series of voltage pulses, the cholesteric liquid crystal layer can be switched between these two states. Because there is a significant energy barrier between these two states, the display exhibits a bistable behavior: the display retains the image even when the applied voltages are switched off. Cholesteric liquid crystal displays therefore consume power only when their information content is changed, allowing a lower power consumption of displays that display relatively stable information, such as those in mobile phones. The use of cholesteric liquid crystal material in displays has the advantage that these displays reflect light much more like paper, thereby improving the image quality. A cholesteric liquid crystal display can be made suitable for displaying color images by stacking three cholesteric layers having different periodicities which are matched to the red, blue and green wavelengths, respectively.

For real video (moving images) applications preferably the material of the LCD panel is a twisted nematic (TN) crystal and the display panel an active matrix (AM) display. Such a liquid crystal allows higher switching rates so that a display panel provided with such a liquid crystal is very suitable to display moving images. The liquid crystal may be a super twisted nematic crystal which allows rotating of the polarization direction over 180° to 360°, in either a grey tone or a colour version. Also an AM display has better video capabilities than a passive matrix display. Especially the use of a so-called LTPS AM LCD in the present image-sensing display device seems to be very promising. A CMOS camera, the pixel switches, the drivers, the interface circuitry and logical circuitry may be integrated in the glass op this LCD. The acronym LTPS means low temperature silicon and relates to the method of manufacturing of and the substrate material used in this LCD panel.

Figure 13:
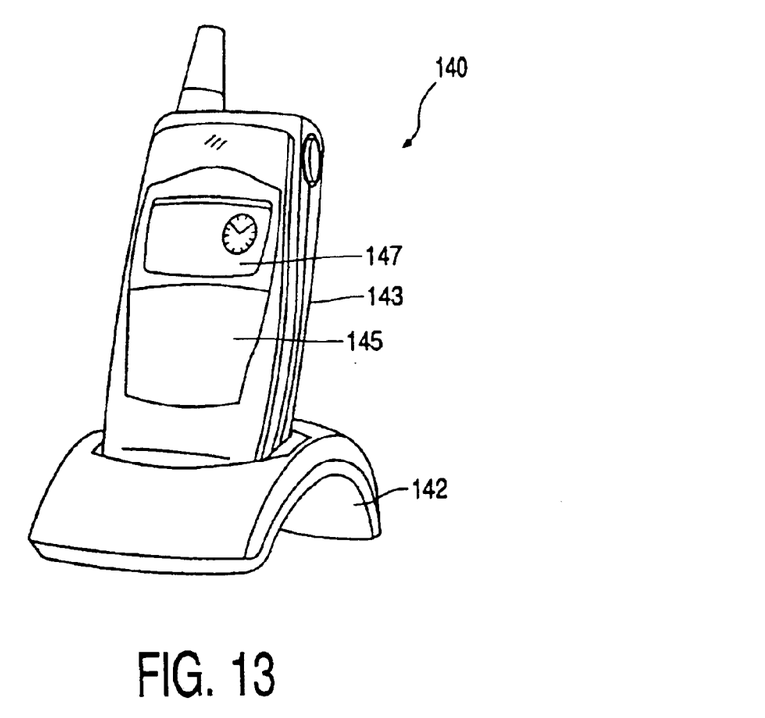
FIG. 13 shows a cordless videophone apparatus provided with an image-sensing display device.

The image-sensing display device of the present invention may not only be used in a mobile videophone apparatus, but also in a cordless videophone apparatus 140 as shown in FIG. 13. In this Figure, 142 is the base station which is connected to a phone or cable network and 143 is the movable apparatus which can be used within an area of, for example, less than 100 m from the base station. Apparatus 143 comprises a key section 145 and an image-sensing display device 147 constructed as described hereinbefore. For the mobile and cordless videophone apparatus, the compactness, i.e. the small depth, of the image-sensing display device and minimal power consumption of this device are important features.

Figure 14:
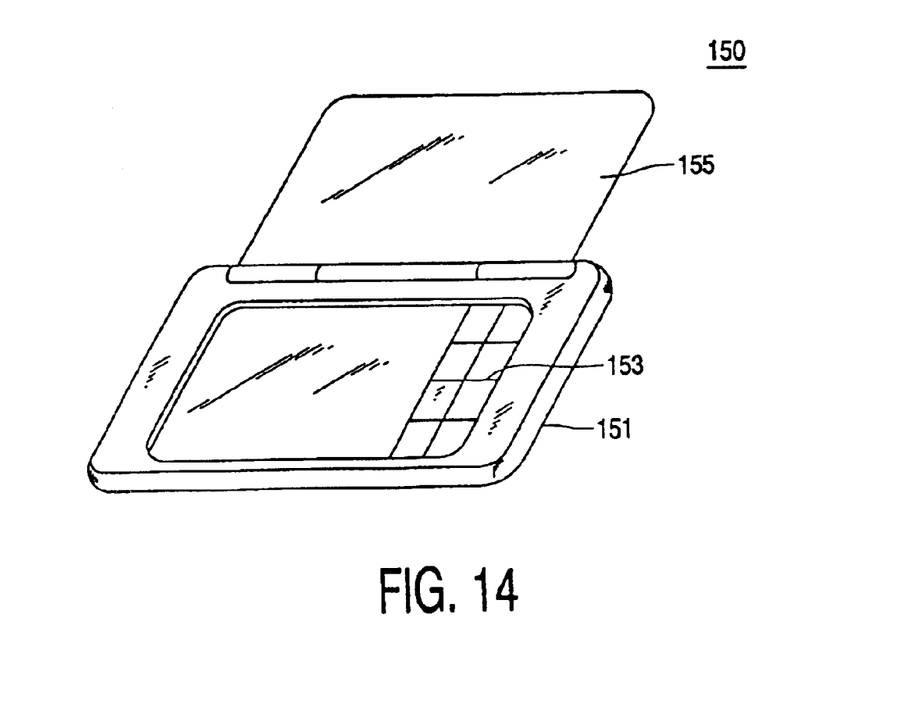
FIG. 14 shows a notebook provided with an image-sensing display device.

This is also the case for a portable computer, known as notebook, 150 shown in FIG. 14. In this Figure, 151 is the base part accommodating the different modules and the keyboard 153. Reference numeral 155 denotes the monitor part, which conventionally has only a display function. If the monitor is constructed as described herein before, it has also a camera function. The invention may also be implemented in a hand-held computer, known as "palmtop" device. By replacing the conventional display of this device by a image-sensing display of the present invention the device can be enlarged with a camera function.

Figure 15:
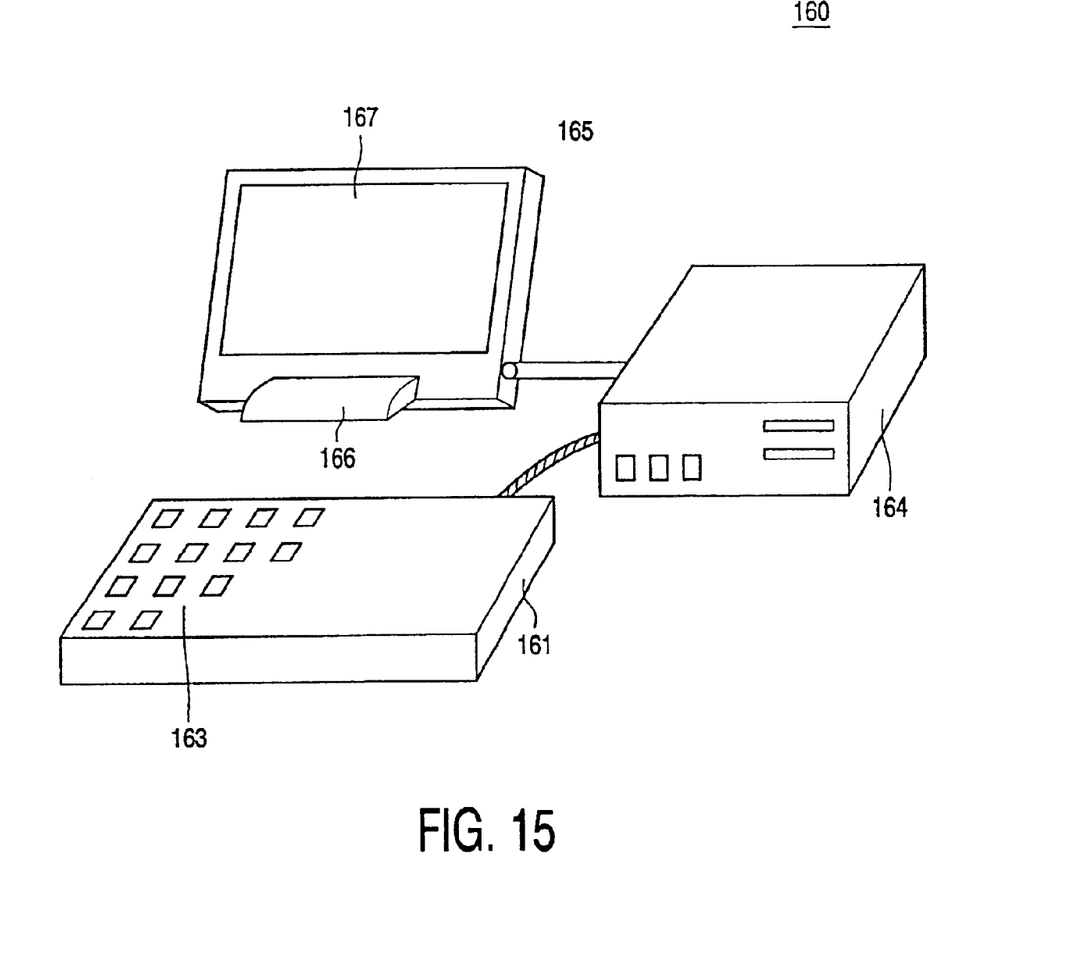
FIG. 15 shows a desk top computer provided with an image-sensing display device.

FIG. 15 shows a desktop computer 160 comprising a keyboard 161, a computer box 164 and a monitor 165. The monitor is a flat LCD monitor fixed in a support 166. The reference numeral 167 denotes an image-sensing display device constructed as described herein before, so that, in addition to the conventional display function, the monitor also has a camera function.

What is claimed is:

1. An image-sensing display device comprising:

an image display part including a reflective LCD display panel and a front-lighting means, the reflective LCD display panel including a surface area of a liquid crystalline layer, wherein substantially the whole surface area of the liquid crystalline layer is occupied by effective areas of pixels, the front-lighting means for illuminating the reflective LCD display panel during a display mode of the image-sensing display device, the front-lighting means including a transparent light guiding plate, the light guiding plate having a lower main flat surface, an upper main flat surface that is substantially parallel to the lower main flat surface, and side surfaces, the front-lighting means further including at least one light source arranged opposite an entrance face corresponding to at least one of the side surfaces, and a side face opposite the entrance face that is made reflective, the light guiding plate further having scattering elements, wherein light rays from the at least one source enter the light guiding plate via the at least one of the side surfaces and are totally internally reflected until reaching a scattering element, the scattering element reflecting light incident thereon in different directions, wherein a portion of the reflected light passes through the lower main flat surface and propagates to the reflective LCD display panel and wherein a remaining portion of the reflected light propagates through the light guiding plate, wherein further substantially all the light that enters the light guiding plate via the at least one of the side surfaces is coupled out of the light guiding plate and directed towards the reflective LCD display panel further wherein the reflective LCD display modulates substantially all of the light incident on the reflective LCD display panel for display of an image;

an image-sensing part arranged on top of the reflective LCD display panel of the image display part, the image-sensing part for capturing at least one image during a camera mode of the image-sensing display device, the image-sensing part including a two-dimensional array of photosensitive elements, wherein the front-lighting means of the image display part is arranged in front of the array of photosensitive elements on top of the reflective LCD display panel; and a lens means mounted to a front of the image display part wherein the image-sensing display device successively comprises from its base, the reflective LCD display panel, the image-sensing part, the front-lighting means and the lens means juxtaposed in a Z-direction and integrated in one module.

* * * * *